United States Patent [19]

Plachy

[11] 4,280,646
[45] Jul. 28, 1981

[54] TAPE TRANSPORT CAPSTAN

[75] Inventor: Ivo T. Plachy, San Mateo, Calif.

[73] Assignee: Telex Computer Products, Inc., Tulsa, Okla.

[21] Appl. No.: 44,100

[22] Filed: May 31, 1979

[51] Int. Cl.³ .................................. B65H 17/20
[52] U.S. Cl. ........................................ 226/190
[58] Field of Search ............... 226/117, 168, 190–194; 242/206–210

[56] References Cited

U.S. PATENT DOCUMENTS

| 2,715,024 | 8/1955 | Nydegger et al. | 226/191 |
| 3,174,670 | 3/1965 | Zernov | 226/117 |
| 3,559,861 | 2/1971 | Knox | 226/168 |
| 4,065,044 | 12/1977 | Painter et al. | 226/188 |

Primary Examiner—Leonard D. Christian
Attorney, Agent, or Firm—Head & Johnson

[57] ABSTRACT

A capstan for use on a tape transport, including a hub, a tubular outer rim supported co-axially about the hub, and a body portion of foam plastic between the hub and rim.

15 Claims, 6 Drawing Figures

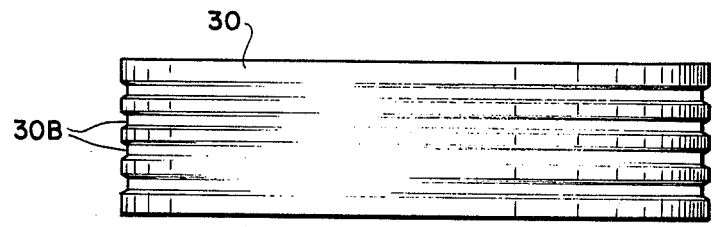
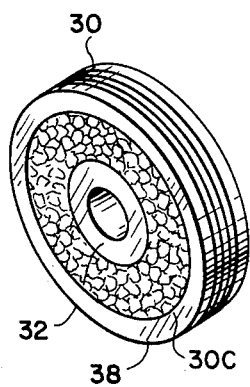
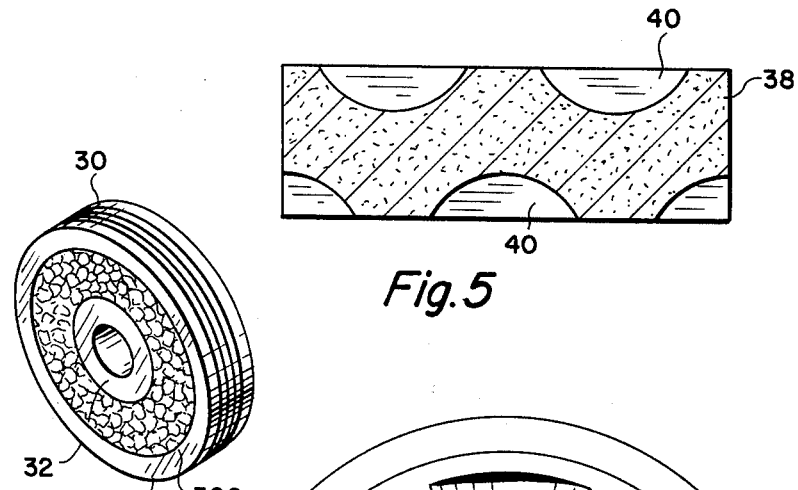
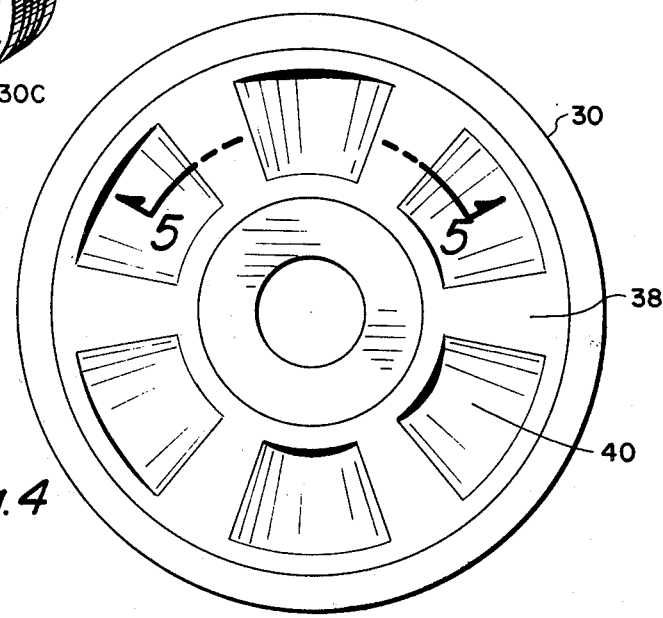

TAPE TRANSPORT CAPSTAN

BACKGROUND OF THE INVENTION

1. Field of the Invention

This invention relates to a capstan for use in a magnetic tape transport system and more particularly to a capstan which has low mass, a low moment of inertia-to-diameter ratio, and which is inexpensive to manufacture compared to other capstans having similar characteristics.

2. Description of the Prior Art

In the computer industry it is important to accelerate magnetic tape from a stop position to a preselected rate, such as 200 inches per second, in a very short time. In like manner, when the tape is running, it is desired to stop the tape in an exceedingly short period of time. In some instances the tape must be started in one direction and very quickly thereafter stopped and reversed and moved in the opposite direction. For a given tape speed and start and stop distances, a power required to accelerate the capstan is proportional to the square of the mass moment of inertia. It can be seen that providing a capstan of very low mass and very low moment of inertia-to-diameter is exceedingly important. Others have provided capstans having these desired characteristics. Reference may be had to U.S. Pat. No. 4,065,044 entitled "CAPSTAN", issued Dec. 27, 1977. This patent provides a type of capstan wherein the goal is the same as in the present invention, that is, a capstan for driving a magnetic tape wherein the capstan has a low mass and a low moment of intertia-to-diameter ratio. References cited in this patent may also be resorted to as background information for the type of product to which the present invention is directed.

Briefly stated, an object of the present invention is to provide a capstan for use in magnetic tape transport systems in which the capstan has a low mass and a low inertia-to-diameter ratio and particularly wherein such goals are achieved in a new way facilitating the construction of the capstan much more expeditiously and economically than prior known construction methods.

SUMMARY OF THE INVENTION

A capstan for use in a tape transport system is provided, the capstan being adapted for mounting on a rotatable shaft in the transport system, the capstan including a hub to be received on and rotated by the shaft, a tubular outer rim supported coaxially about the hub, and a body portion of foam plastic between the hub and the rim.

The invention is also directed towards a method of manufacturing a capstan comprising positioning a tubular outer rim in a cylindrical cavity mold, the internal diameter of the mold being equal to the external diameter of the rim, the mold having opposed end surfaces perpendicular to the cavity axis and having a cylindrical shaft extending from the end surface axially of the mold cavity, inserting a hub having an axial opening therein onto the shaft within the mold cavity whereby the hub is supported coaxially of the tubular outer rim, filling the mold cavity with uncured foam plastic, closing the mold cavity with an end cap providing a second end surface parallel to and spaced from the mold end surface, and curing the foam plastic within the mold cavity to bind the hub and rim into a unitary device.

BRIEF DESCRIPTION OF THE DRAWINGS

FIG. 3 is an elevational view of a completed capstan showing the external configuration of the outer rim and showing the circumferential surface which contacts tape to drive the tape as the capstan is utilized in a tape transport device.

FIG. 4 is an end view of a completed capstan showing an alternate embodiment wherein recesses are molded in the side walls of the capstan to further reduce the mass thereof.

FIG. 5 is a cross-sectional view taken along the arcuate line 5—5 of FIG. 4 showing how recesses may be formed in a capstan manufactured according to the principles of this invention so as to further reduce the mass.

FIG. 6 is an isometric view of a capstan according to the invention having planar ends.

DETAILED DESCRIPTION

Figure 1:
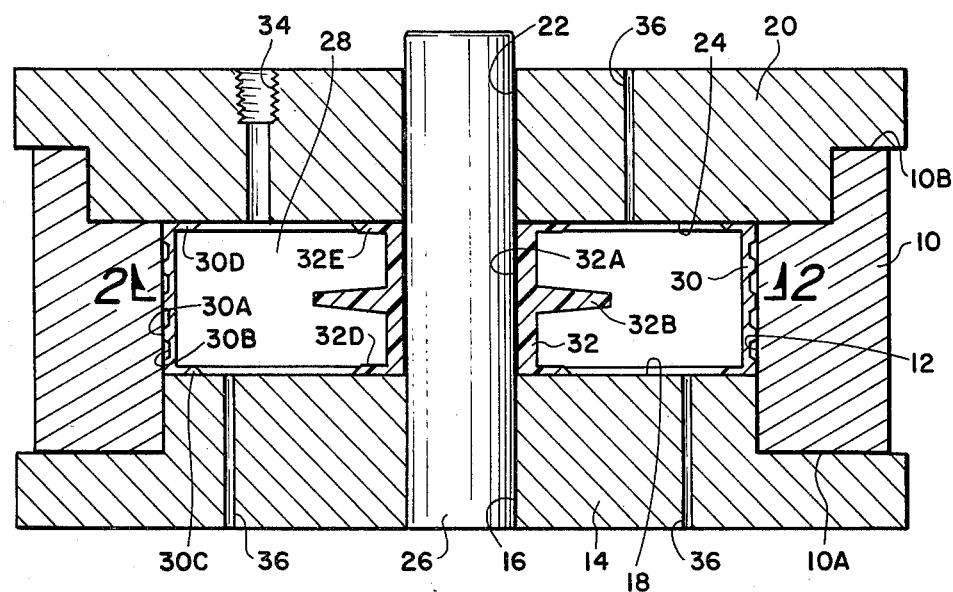
FIG. 1 is a cross-sectional view of a mold used in manufacturing the styrofoam capstan of this invention showing elements of the capstan within the mold.

Referring first to FIG. 1, the method of manufacturing a capstan according to the invention will be described. The method employs a mold having four basic pieces, that is, a cylindrical body 10 having a cylindrical cavity 12 therein. Affixed to one end 10A of the mold body is an end panel 14 having an axial opening 16 therein. The end panel has a surface 18 perpendicular the axis of opening 16, the surface 18 forming a boundary of the mold cavity. Affixed to the other end of the mold body 10 in engagement with the opposite end surface 10B is an end cap 20 having an axial opening 22 therein. The end cap 20 has a planar surface 24 perpendicular the axial opening 22 and is supported so as to be parallel to the surface 18 of the end panel 14. End cap 20 is removable from the body 10 such as by means of bolts (not shown) or removable clamps may be employed (also not shown). Received in openings 16 and 22 is a cylindrical shaft 26.

These four elements, that is, body 10, end panel 14, end cap 20, and shaft 24 form the basic parts of the mold for use in manufacturing the capstan which will be subsequently described. These four parts define an area or cavity 28 which establishes the dimensions of the capstan to be formed.

Positioned within cavity 28 is a tubular outer rim 30 formed of metal or high density plastic. Rim 30 is a tubular element having an outer surface 30A which defines the tape engaging surface of the completed capstan. The outer surface 30A may be provided, as illustrated, with a plurality of circumferential grooves 30B to increase the effectiveness of contact of the surface with the tape during high-speed operation. The grooves 30B provide improved means for escape of air trapped between the tape and the peripheral surface of the capstan during rapid movement of the tape. The use of grooves 30B is a known expediency in capstan design.

The outer rim may also include, as illustrated, integral reduced diameter circumferential flanges 30C and 30D. The flanges are on opposed ends of the rim.

Figure 2:
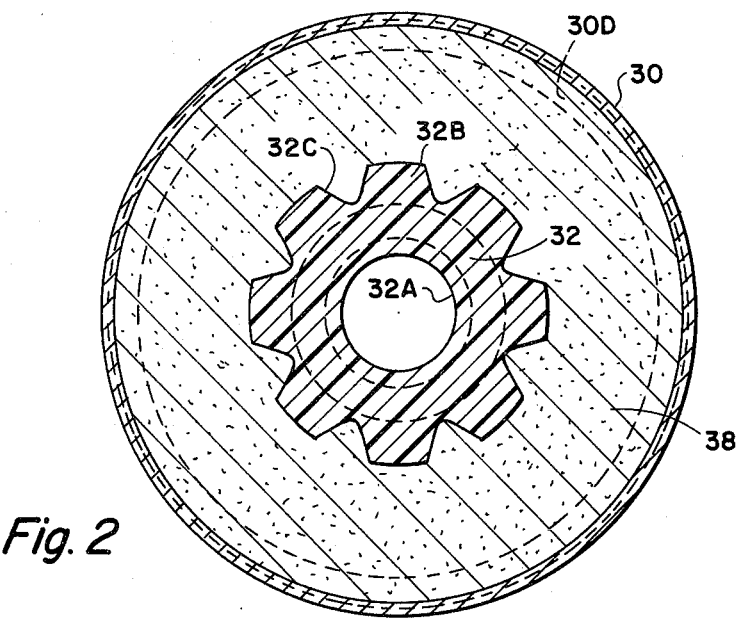
FIG. 2 is a cross-sectional view of the capstan taken along the line 2—2 of FIG. 1 and showing the capstan after removal of the mold.

Positioned on shaft 18 is a capstan hub 32 formed of high density plastic or metal. Hub 32 has an axial opening 32A and is the opening which receives the drive shaft of a tape transport system when the capstan is in use. The hub 32 must transmit torque from itself to the outer rim 30. An integral enlarged diameter portion 32B has a non-circular cylindrical peripheral surface as illustrated in FIG. 2 formed by notches 32C. Any configuration of the hub providing an exterior peripheral surface for increased torque transmitting characteristics would be within the scope of the invention.

Hub 32 may also include, as illustrated, enlarged diameter flanges 32D and 32F integrally formed with the hub.

In one method, the capstan is completed by injecting into cavity 28 through an injection opening 34 formed in cap 20, foam plastic material. The injected material solidifies, completely filling the cavity, and forms the base material of the capstan to not only permanently support the outer rim 30 concentrically about the hub 32 but forms the means of transmitting torque from the hub to the rim.

In another means of constructing the capstan, the cavity 28 is filled with styrofoam pellets. After filling, the cavity end cap 20 is secured in position, and the pellets are treated to form a solid mass of styrofoam such as by the injection of steam into injection opening 34. Gas trapped in the styrofoam pellets expands the pellets into a homogenous solid mass. Vent holes 36 are also preferably provided in end panel 14 and end cap 20 to allow gas to escape and to insure that the entire cavity 28 is completely filled with foam plastic after the treatment process.

As soon as the foam plastic has solidified, end cap 20 is removed and the completed capstan removed from the mold. The capstan then appears as in FIG. 6 while FIG. 3 shows the preferred configuration of the outer rim 30 and the grooves 30B in the peripheral surface.

The end walls of the completed capstan are planar conforming to the planar surface 18 of end panel 14 and planar surface 24 of end cap 20. FIGS. 4 and 5 show an alternate arrangement wherein the mass of the capstan may be further reduced. In this arrangement the surface 18 of end panel 14 and surface 24 of end cap 20 are provided with spaced protrusions (not shown) which reduce the volume of cavity 28. In such an arrangement the finished capstan will appear as shown in FIG. 4 wherein recesses 38 are formed in the capstan side walls. The specific configuration of the recesses is optional; and in the preferred arrangement, as illustrated in FIG. 5, the recesses are arranged so as to be in opposite orientation from each of the end walls for increased structural rigidity.

The plastic foam, such as styrofoam, filling the mold 28 forms the capstan body 38 as shown in FIGS. 2 and 6. Thus the completed capstan includes the three basic elements of a hub 32, the capstan body 38, and the outer rim 30. These elements are secured to each other by the adhesive effect foam plastic so that the completed capstan is a unitary device of exceedingly light weight, yet is sufficiently strong to impart the required acceleration to magnetic tape in a tape transport system.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed is:

1. A capstan for use in a tape transport system adapted for mounting on a rotatable shaft comprising:
   a hub adapted to be rotated about its axis;
   a tubular outer rim supported coaxially about said hub, and
   a unitary body portion of homogeneous foam plastic between the full external circumference of said hub and the full internal circumference of said rim.

2. A capstan according to claim 1 in which said hub has a tubular portion, the opening therein adaptable to receive a shaft, the tubular portion having opposed ends and an integral enlarged diameter portion intermediate the ends, the periphery of the enlarged diameter portion being non-circular.

3. A capstan according to claim 2 wherein said hub tubular portion has integral enlarged diameter portions at each end.

4. A capstan according to claim 1 wherein said tubular outer rim has circumferential grooves in the outer cylindrical surface.

5. A capstan according to claim 1 wherein said tubular outer rim has integral, reduced diameter circumferential flanges at each end.

6. A capstan according to claim 1, said foam plastic body portion forms paralleled opposed end walls, and wherein said body portion has spaced apart recesses in at least one of the end walls.

7. A capstan according to claim 1 wherein said body portion is of styrofoam.

8. A capstan for use in a tape transport system adapted for mounting on a rotatable shaft comprising:
   a hub having a tubular portion, the opening therein being adaptable to receive a shaft, the tubular portion having opposed ends and an integral enlarged diameter portion intermediate the ends, the periphery of the enlarged diameter portion being non-circular;
   a tubular outer rim supported coaxially about said hub; and
   a body portion of foam plastic between said hub and rim.

9. A capstan according to claim 8 wherein said hub tubular portion has integral enlarged diameter portions at each end.

10. A capstan according to claim 8 wherein said tubular outer rim has integral, reduced diameter circumferential flanges at each end.

11. A capstan according to claim 8, said foam plastic body portion forms paralleled opposed end walls, and wherein said body portion has spaced apart recesses in at least one of the end walls.

12. A capstan for use in a tape transport system adapted for mounting on a rotatable shaft comprising:
   a hub adapted to be rotated about its axis;
   a tubular outer rim supported coaxially about said hub; and
   a body portion of foam plastic between said hub and rim having paralleled opposed end walls and spaced apart recesses in at least one of the end walls.

13. A capstan according to claim 12 in which said hub has a tubular portion, the opening therein adaptable to receive a shaft, the tubular portion having opposed ends and an integral enlarged diameter portion intermediate the ends, the periphery of the enlarged diameter portion being non-circular.

14. A capstan according to claim 13 wherein said hub tubular portion has integral enlarged diameter portions at each end.

15. A capstan according to claim 12 wherein said tubular outer rim has integral, reduced diameter circumferential flanges at each end.

* * * * *